United States Patent
Patel et al.

(10) Patent No.: US 11,016,947 B1
(45) Date of Patent: May 25, 2021

(54) APPARATUS AND METHOD FOR RECOMMENDING AND MAINTAINING ANALYTICAL VIEWS

(71) Applicant: Cloudera, Inc., Palo Alto, CA (US)

(72) Inventors: Priyank Patel, Fremont, CA (US); Anjali Betawadkar-Norwood, Campbell, CA (US); Douglas J. Cameron, Santa Cruz, CA (US); Shant Hovsepian, New York, NY (US); Sushil Thomas, San Francisco, CA (US)

(73) Assignee: Cloudera, Inc., Palo Alto, CA (US)

(*) Notice: Subject to any disclaimer, the term of this patent is extended or adjusted under 35 U.S.C. 154(b) by 309 days.

(21) Appl. No.: 15/385,802

(22) Filed: Dec. 20, 2016

(51) Int. Cl.
*G06F 17/30* (2006.01)
*G06F 16/182* (2019.01)
*G06F 16/27* (2019.01)
*G06F 16/903* (2019.01)

(52) U.S. Cl.
CPC ........... *G06F 16/182* (2019.01); *G06F 16/27* (2019.01); *G06F 16/90335* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 6,334,128 | B1* | 12/2001 | Norcott | G06F 16/2393 |
| 6,882,993 | B1* | 4/2005 | Lawande | G06F 16/2393 707/714 |
| 8,478,742 | B2* | 7/2013 | Folkert | G06F 16/2393 707/718 |
| 2004/0122804 | A1* | 6/2004 | Zhang | G06F 16/24539 |
| 2004/0122814 | A1* | 6/2004 | Zhang | G06F 16/24539 |
| 2005/0234971 | A1* | 10/2005 | Folkert | G06F 16/2393 |
| 2005/0235004 | A1* | 10/2005 | Folkert | G06F 16/24539 |
| 2006/0253483 | A1* | 11/2006 | Yu | G06F 16/24539 |
| 2007/0226264 | A1* | 9/2007 | Luo | G06F 16/24535 |
| 2013/0332487 | A1* | 12/2013 | Ramesh | G06F 16/24539 707/775 |
| 2014/0280028 | A1* | 9/2014 | Ding | G06F 16/2393 707/717 |
| 2014/0280029 | A1* | 9/2014 | Ding | G06F 16/24539 707/717 |

\* cited by examiner

*Primary Examiner* — Hung D Le
(74) *Attorney, Agent, or Firm* — Staniford Tomita LLP

(57) ABSTRACT

A system has a distributed database with database partitions distributed across worker nodes connected by a network. An analytical view recommendation engine defines an analytical view comprising attributes and measures defined prior to the receipt of a query. The analytical view is maintained as a data unit separate from the distributed database. The analytical view recommendation engine includes instructions executed by a processor to identify a poorly performing report, evaluate queries associated with the poorly performing report, create a recommended analytical view to enhance the performance of the poorly performing report, and deploy the recommended analytical view.

20 Claims, 2 Drawing Sheets

APPARATUS AND METHOD FOR RECOMMENDING AND MAINTAINING ANALYTICAL VIEWS

FIELD OF THE INVENTION

This invention relates generally to distributed databases. More particularly, this invention relates to techniques for recommending analytical views to maintain accelerated system performance.

BACKGROUND OF THE INVENTION

A distributed database is a database in which storage devices are not all attached to a common processing unit, such as a central processing unit. Instead, multiple computers are used to implement a distributed database management system. The multiple computers may be located in the same physical location, or they may be dispersed over a network of disaggregated interconnected computers. There is typically a master node and a set of slave or worker nodes that store partitions of the distributed database.

An analytical view is a subset of data from a table or multiple tables. The analytical view may be computed by applying joins, unions, applying filters or other Structured Query Language (SQL) operations to the table or tables. The analytical view typically comprises dimensions and measures, although either dimensions or measures may be absent. The analytical view may comprise an attribute (e.g., a column name or dimension) and a measure (e.g., an aggregate, such as sum, minimum, maximum, average, number of distinct values, etc.) that is defined prior to the receipt of a query and is maintained as a data unit separate from the table. An attribute can be a dimension or a measure. When data is grouped along an attribute, it becomes a dimension. When data is aggregated on an attribute, it becomes a measure. For example, in the case of the request for 'sum(amt) by product_id', product_id and amt are both attributes in the table. Product_id is used as a dimension and amt is used as a measure. The analytical view exposes a dimension 'product_id' and an aggregate 'sum(amt)'.

Database systems use analytical views to expedite query processing. Analytical views typically materialize (e.g., cache) data resulting from computations frequently needed by queries. When a database system can prove that, semantically, it is correct to answer the query using the data in an analytical view, the system uses the pre-aggregated data from the analytical view to save processor and input/output bandwidth. This results in expedited processing of the query.

Reports collect data from a distributed database and/or an analytical view based upon a set of queries specified by the report. There is an ongoing need to improve the execution performance of reports to meet users' system performance expectations and to reduce computational load on a system.

Accordingly, there is a need to continuously evaluate report performance and selectively recommend analytical views to enhance report performance.

The data in tables is typically not static, new data continues to get loaded into tables. In addition, new nodes get added to a cluster to deal with increased workload. It is important to provide predictable performance for reports even though the amount of data being analyzed is ever increasing.

Moreover, the reports themselves are not static. New reports are frequently created and existing reports are updated with new visualizations to gain better insights. Unused older reports may be deleted.

Accordingly, there is a need to continuously evaluate whether existing analytical views are sufficient to accelerate report performance. It should be determined whether new analytical views need to be created, whether existing analytical views can be improved or merged together and whether unused analytical views should be dropped.

This invention addresses the problem of improving and maintaining performance of queries and reports in an ever-changing system by dynamically and continuously maintaining acceleration structures, such as analytical views.

SUMMARY OF THE INVENTION

A system has a distributed database with database partitions distributed across worker nodes connected by a network. An analytical view recommendation engine defines an analytical view comprising attributes and measures defined prior to the receipt of a query. The analytical view is maintained as a data unit separate from the distributed database. The analytical view recommendation engine includes instructions executed by a processor to identify a poorly performing report, evaluate queries associated with the poorly performing report, create a recommended analytical view to enhance the performance of the poorly performing report, and deploy the recommended analytical view.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
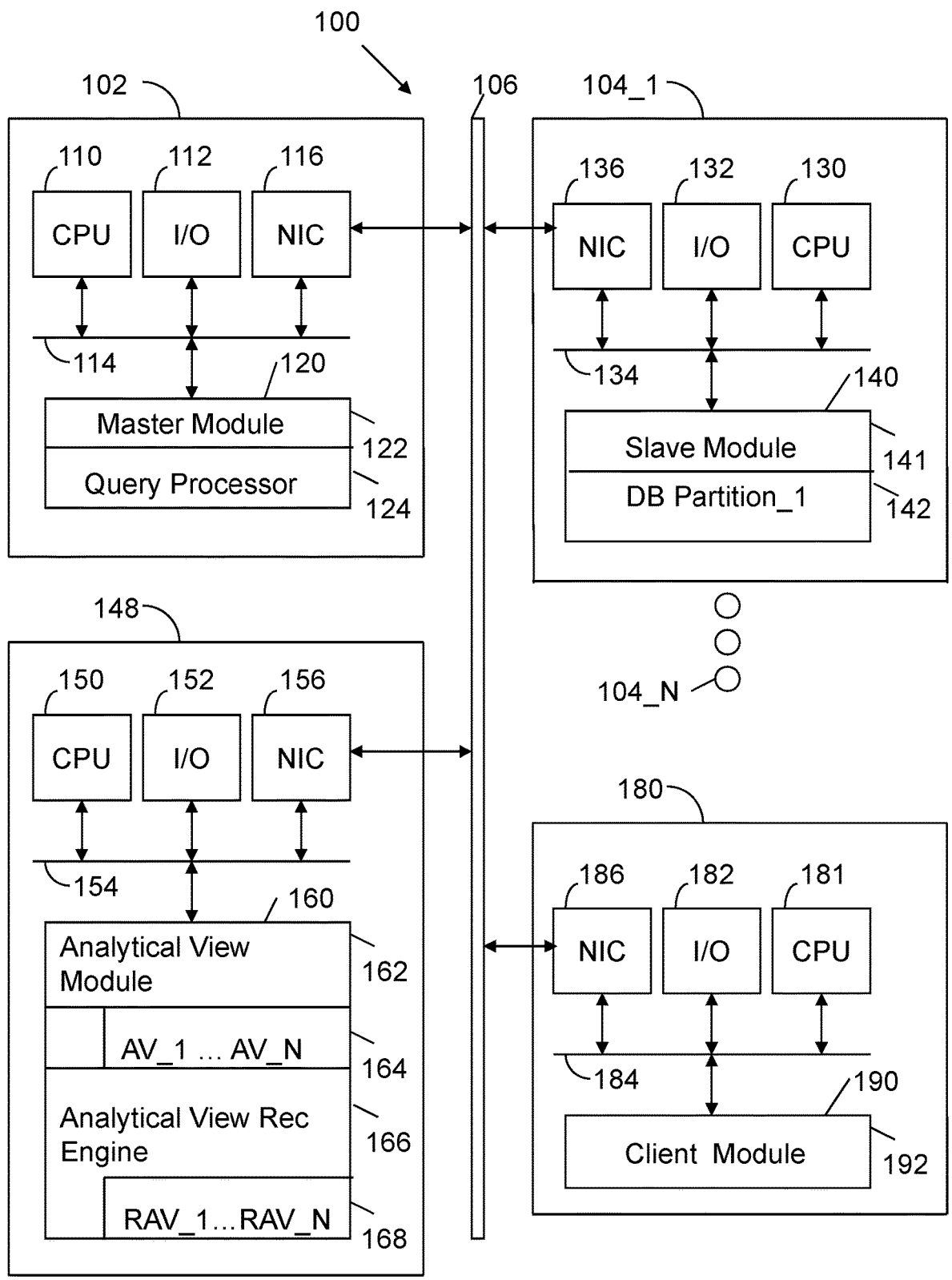
FIG. 1 illustrates a system configured in accordance with an embodiment of the invention.

FIG. 1 illustrates a system 100 configured in accordance with an embodiment of the invention. The system 100 includes a master machine 102 in communication with a set of slave or worker machines 104_1 through 104_N via a network 106, which may be any combination of wired and wireless networks. The master machine 102 includes standard components, such as a central processing unit 110 in communication with a set of input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 includes instructions executed by the central processing unit 110. In particular, the memory 120 stores a master module 122, which includes executable instructions to perform master node operations associated with a distributed database. The memory 120 also stores a query processor 124, which processes queries by applying them across the distributed database implemented across the worker nodes 104_1 through 104_N. The query processor 124 may execute queries associated with a report or may execute ad hoc queries.

Worker machine 104_1 also includes standard components, such as a central processing unit 130, input/output devices 132, a bus 134, a network interface circuit 136 and a memory 140. The memory 140 stores a slave module 141 to implement slave processing at the direction of the master machine 102. The memory 140 also stores a database partition 142 of a distributed database.

An analytical view machine 148 may also be connected to network 106. The analytical view machine 148 is a query support machine that also includes standard components, such as a central processing unit 150, input/output devices 152, a bus 154, a network interface circuit 156 and a memory 160. The memory 160 stores an analytical view module 162. The analytical view module 162 includes instructions executed by the central processing unit 150 to define an analytical view comprising attributes and measures. The analytical view is maintained as a data unit separate from the distributed database. A set of analytical views AV_1 through AV_N 164 may be associated with the analytical view module 162.

The analytical view machine 148 also stores an analytical view recommendation engine 166. In one embodiment, the analytical view recommendation engine 166 recommends a new analytical view in response to an ad hoc query. For example, a command line interface may be used to accept the designation of a report, which is then evaluated to determine whether a recommended analytical view can improve report performance. In another embodiment, the analytical view recommendation engine 166 is implemented as a background process that continuously evaluates existing reports to determine whether report performance can be enhanced through recommended analytical views. The analytical view recommendation engine 166 produces a set of analytical views RAV_1 through RAV_N 168. The recommended analytical views are utilized by analytical view module 162. The analytical view recommendation engine 166 may be incorporated into the analytical view module and vice versa.

FIG. 1 also illustrates a client machine 180 connected to network 106. The client machine 180 includes standard components, such as a central processing unit 181, input/output devices 182, a bus 184, a network interface circuit 186 and a memory 190. The memory 190 stores a client module 192, which allows the client machine to pass queries to the query processor 124 of the master machine 102, which executes the query across the distributed database implemented across worker machines 104_1 through 104_N. The queries may be ad hoc queries or queries contained within a pre-defined report. Alternately or in addition, the client machine 180 may apply the query to the analytical view machine 148, which may implement a separate query processor. Indeed, the components of analytical view machine 148 may be incorporated into master machine 102 and vice versa.

Figure 2:
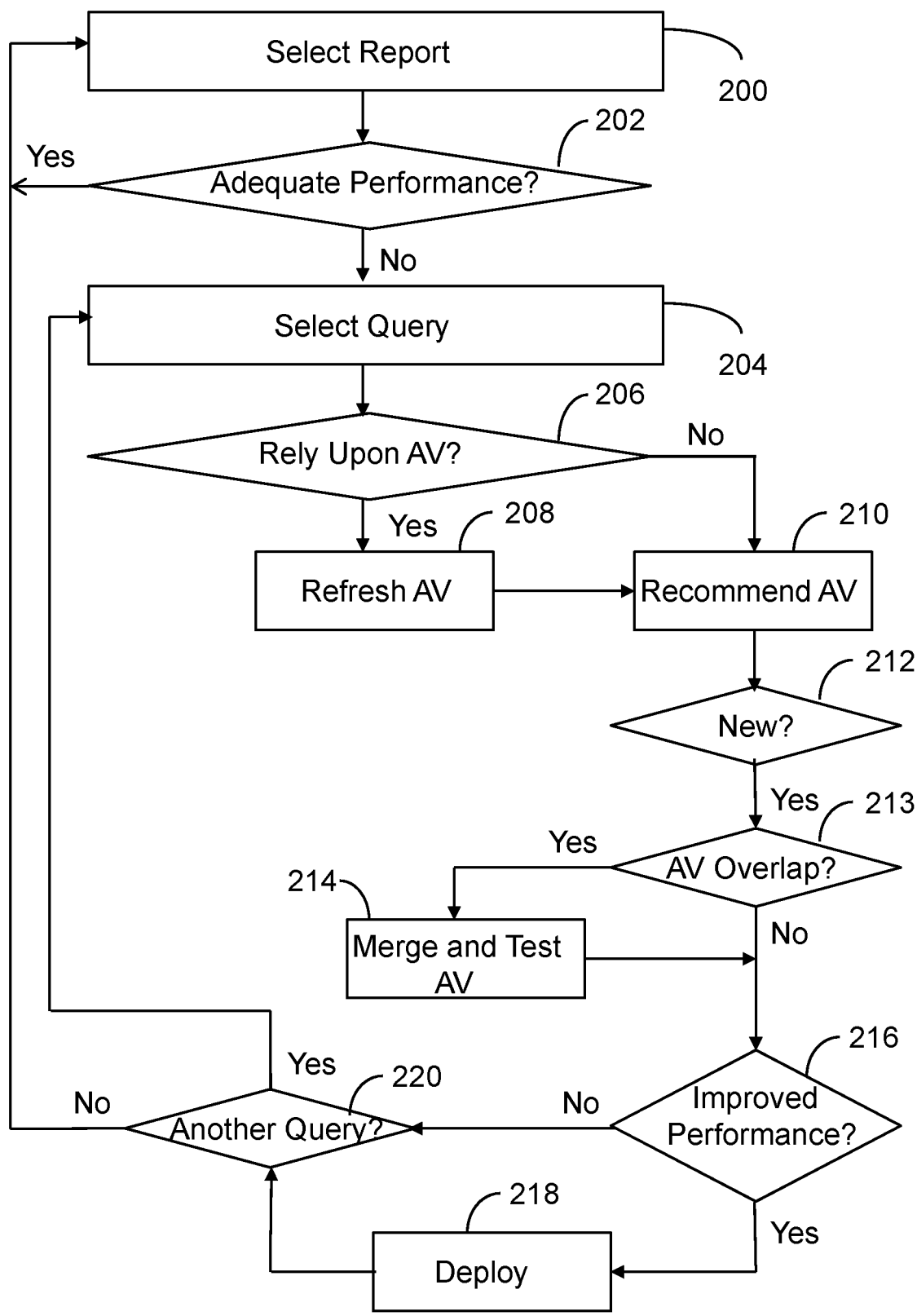
FIG. 2 illustrates processing operations associated with an embodiment of the invention.

FIG. 2 illustrates processing operations associated with an embodiment of the analytical view recommendation engine 166. The processing of FIG. 2 corresponds to the utilization of the analytical view recommendation engine 166 as a background process. A subset of the operations of FIG. 2 (e.g., blocks 204-220) may be used to support ad hoc evaluations of a report.

Initially, a report is selected 200. It is then determined whether the report is demonstrating adequate performance 202. Various metrics may be used to define adequate performance. For example, a metric may specify that a report be rendered within a specified number of computation cycles. Alternately or in addition, a metric may be specified that the analytical view or views utilized by the report be under some threshold size.

If the report is demonstrating adequate performance (202—Yes), control returns to block 200 and another report is selected. If the report is not demonstrating adequate performance (202—No), the different queries associated with the report are sequentially evaluated. A query is selected 204. It is then determined whether the query relies upon an analytical view 206. If so (206—Yes), the analytical view is refreshed 208. This insures that the analytical view has incorporated new relevant data within the distributed database. After analytical view refresh or when the query does not rely upon an analytical view (206—No), an analytical view is recommended 210. It is then determined whether the new recommendation is different than the analytical view to which the query is routed 212. If the recommended analytical view is new (212—Yes), then processing proceeds to block 213. If the recommended analytical view is not new (212—No) it is ignored and processing jumps to block 220 (arrow not shown).

Consider the following queries associated with a report:

App 275
SELECT weekofyear((TA_0.'partition_date')) as 'weekofyear(partition_date)', TA_0.'region' as 'region', sum ((TA_0.'settle_txn_amt')) as 'sum(settle_txn_amt)'
FROM 'test_mid_market'.'merchant_txn_dma_parq' TA_0
GROUP BY 1, 2
LIMIT 100

App 276
SELECT TA_0.'dma_region' as 'dma_region', sum ((TA_0.'settle_txn_amt')) as 'sum(settle_txn_amt)'
FROM 'test_mid_market'.'merchant_txn_dma_parq' TA_0
WHERE TA_0.'region' in ("South")
GROUP BY 1
LIMIT 100

App 277
SELECT TA_0.'partition_date' as 'partition_date', sum(if ((TA_0.'merchant_id_hash')=111, settle_txn_amt,0)) as 'Merchant',
sum(if((TA_0.'merchant_id_hash') !=111, settle_txn_amt,0)) as 'Others'
FROM 'test_mid_market'.'merchant_txn_dma_parq' TA_0
GROUP BY 1
ORDER BY 1 ASC
LIMIT 100

App 278
SELECT TA_0.'dma_region' as 'dma_region', sum(if ( dayofmonth((TA_0.'partition_date'))>15,
(TA_0.'settle_txn_amt'), 0))/sum(if (dayofmonth ((TA_0.'partition_date'))<=15,
(TA_0.'settle_txn_amt'), 0))–1 as 'Growth'
FROM 'test_mid_market'.'merchant_txn_dma_parq' TA_0
WHERE TA_0.'merchant_id_hash' in (111)
GROUP BY 1
LIMIT 100

In block 213 it is determined whether the analytical view overlaps with other existing analytical views (e.g., it contains data in common with other existing analytical views). If so (213—Yes), analytical views are merged and tested 214. The merging of analytical views avoids storing repeated data and to otherwise optimizes disk space. The analytical view recommendation engine 166 uses cardinality and costing heuristics to decide when recommended analytical views should be merged.

The testing of the merged analytical view may rely upon system restrictions. Similarly, the testing of any newly recommended analytical view may rely upon system restrictions. For example, the system restriction may be a limit on disc space for the recommended analytical view. The limit may be for the recommended analytical view or it may be for the aggregate recommended analytical views to insure that the analytical view recommendation engine 166 does not monopolize system resources. The system restriction may also be in the form of a time window that should be used for refreshing the recommended analytical view (e.g., the time window would typically be in the middle of the night when computational demand on the system is low).

After a merged analytical view is tested or in the case of no analytical view overlap (213—No), control proceeds to block 216 to determine whether the new analytical view improves performance.

Below is an example of a recommended analytical view to enhance the performance of the queries specified above.

'CREATE ANALYTICAL VIEW
lambda_089a7d31_3a5b_4544_9673_d3666d927e9c AS
SELECT TA_0.merchant_id_hash merchant_id_hash,
  TA_0.dma_region dma_region,
  sum(if(dayofmonth((TA_0.partition_date))>15,
  (TA_0.settle_txn_amt), 0)) c2',
  sum(if(dayofmonth((TA_0.partition_date))<=15,
  (TA_0.settle_txn_amt), 0))_c3',
  TA_0.region region,
  sum((TA_0.settle_txn_amt))_c5,
  (TA_0_) partition_date,
  sum(if((TA_0.merchant_id_hash)=111,
  settle_txn_amt, 0))_c7',
  sum(if((TA_0.merchant_id_hash) !=111,
    settle_txn_amt, 0))_c8'
FROM test_mid_market.merchant_txn_dma_parq TA_0
GROUP BY TA_0.merchant_id_hash,
  TA_0.dma_region,
  TA_0.region,
  (TA_0.partition_date)'

Determining whether the new analytical view has improved performance 216 may be evaluated using various metrics. One performance metric may be the percentage performance improvement over the prior version of the analytical view as measured by computation cycles. Another performance metric is the expected size of the recommended analytical view. The expected size of the recommended analytical view may be based upon statistics on the sizes of the tables used to generate the analytical view. The performance metrics may be displayed to a user for approval. Alternately, the system may operate autonomously without user input.

If there is no improvement in performance (216—No), it is determined whether there is another query associated with the report 220. If so (220—Yes), control returns to block 204. In this way, each query of the report is evaluated. If there is performance improvement (216—Yes), the recommended analytical view is deployed 218. The condition check of block 220 is then made. After all queries within a report have been evaluated (220—No), control returns to block 200 to evaluate another report.

The analytical view recommendation engine 166 may be configured to create a recommended analytical view that incorporates data that is not required by a query in a report, but is likely to be invoked when reviewing the report. For example, if a report includes a visualization with aggregate sales data for a number of years, the recommended analytical view may be configured to incorporate individual monthly sales data for each individual year. Selecting data that is not required by a query in a report may be based upon an evaluation of dimensions, filters and/or predicates in the report.

When applications/reports are built, there may be parameters in them. When the applications are run, the parameters are bound to constant values. The analytical view module 162 analyzes the variables, their domain and their use in the application and sends these suggestions to the recommendation engine 166. The recommendation engine 166 uses the suggestions to determine how the parameters should be incorporated in the analytical view recommendations.

The analytical view module 162 and the recommendation engine 166 work in a feedback loop, such that the applications are continuously monitored and any poorly performing applications are sent as requests for recommendation to the recommendation engine 166. The recommendation engine 166 in turn provides analytical view recommendations which when deployed cause the analytical view module 162 to run faster.

Variations on the processing of FIG. 2 include processing to determine whether to split an analytical view. In other words, the analytical view recommendation from block 210 may be to split an analytical view. In such a case processing would proceed from block 210 to block 216.

The processing of block 200 may include an evaluation of whether a selected report should be dropped from the system based upon a lack of utilization. The evaluation of whether a query relies upon an analytical view 206 may include an evaluation of whether the analytical view merits maintenance in the system. For example, its size or the number of times that it is used may dictate that the analytical view should be dropped for system performance considerations. In such a case, processing would terminate at block 206 and control would proceed to block 220.

In one embodiment tasks 200 through 208, 216, 218 and 220 are implemented in the analytical view module 162, while tasks 210 through 214 are implemented in the analytical view recommendation engine 166. A feedback loop between the analytical view module 162 and the analytical view recommendation engine 166 monitors and accelerates performance of the poorly performing report. Alternately, as previously referenced the analytical view module 162 and analytical view recommendation engine 168 may be implemented as a single module.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
   a distributed database with database partitions distributed across worker nodes connected by a network; and
   an analytical view recommendation engine to define an analytical view comprising attributes and measures defined prior to the receipt of a query and to maintain as a data unit separate from the distributed database, wherein the analytical view recommendation engine includes instructions executed by a processor to:
   identify a poorly performing report, wherein the poorly performing report includes queries to collect data from the distributed database or analytical view,
   evaluate the queries associated with the poorly performing report,
   create a recommended analytical view from a query of the evaluated queries,
   determine whether the recommended analytical view overlaps with existing analytical views, and if so, merge overlapping analytical views to create the recommended analytical view, and
   test the recommended analytical view to determine if performance of the report is improved, and if so, deploy the recommended analytical view.

2. The system of claim 1 wherein the recommended analytical view is different from an analytical view to which the query of the evaluated queries is routed.

3. The system of claim 1 wherein the analytical view recommendation engine applies system restrictions to the recommended analytical view.

4. The system of claim 3 wherein the system restrictions include one of a limit on disk space for recommended analytical views and a time window for refreshing recommended analytical views.

5. The system of claim 1 wherein the poorly performing report demonstrates inadequate performance relative to one or more metrics specifying rendering within a specified number of computation cycles or in relation to a threshold size.

6. The system of claim 5 wherein the test to determine if performance of the report is improved comprises determining an improvement of the one or more metrics.

7. The system of claim 1 wherein the overlapping analytical views are merged using cardinality and costing heuristics to decide when recommended analytical views should be merged.

8. The system of claim 1 wherein the analytical view recommendation engine is executed by an analytical view machine connected to the network.

9. The system of claim 1 wherein the analytical view recommendation engine is executed by a master machine connected to the network, wherein the master machine coordinates the operation of the plurality of worker nodes.

10. The system of claim 1 wherein the recommended analytical view incorporates data that is not required by a query in the poorly performing report.

11. The system of claim 10 wherein the data that is not required is eliminated based upon an evaluation of dimensions within the poorly performing report.

12. The system of claim 10 wherein the data that is not required is eliminated based upon an evaluation of filters within the poorly performing report.

13. The system of claim 10 wherein the data that is not required is eliminated based upon an evaluation of predicates within the poorly performing report.

14. The system of claim 1 wherein the recommended analytical view is based upon a split of existing analytical views.

15. The system of claim 1 wherein the analytical view recommendation engine is configured to selectively eliminate an analytical view.

16. The system of claim 15 wherein the analytical view recommendation engine selectively eliminates an analytical view based upon one of analytical view size and analytical view usage.

17. The system of claim 1 wherein the analytical view recommendation engine comprises a background process that continuously evaluates existing reports to determine whether performance can be enhanced through recommended analytical views.

18. The system of claim 1 further comprising a feedback loop between an analytical view module and the analytical view recommendation engine to monitor and accelerate performance of the poorly performing report.

19. A method, comprising:
   accessing a distributed database with database partitions distributed across worker nodes connected by a network;
   defining an analytical view comprising attributes and measures defined prior to the receipt of a query and to maintain as a data unit separate from the distributed database;
   identifying a poorly performing report, wherein the poorly performing report includes queries to collect data from the distributed database or analytical view,
   evaluating the queries associated with the poorly performing report,
   creating a recommended analytical view from a query of the evaluated queries;
   determining whether the recommended analytical view overlaps with existing analytical views, and if so, merging overlapping analytical views to create the recommended analytical view; and
   testing the recommended analytical view to determine if performance of the report is improved, and if so, deploying the recommended analytical view.

20. The method of claim 19 wherein the recommended analytical view is different from an analytical view to which the query of the evaluated queries is routed.

* * * * *